United States Patent [19]

Hanmyo et al.

[11] 4,377,347
[45] Mar. 22, 1983

[54] METHOD FOR MEASURING TEMPERATURE OF MOLTEN METAL RECEIVED IN VESSEL

[75] Inventors: Masayuki Hanmyo; Masaru Ishikawa; Seishi Mizuoka, all of Fukuyama, Japan

[73] Assignee: Nippon Kokan Kabushiki Kaisha, Tokyo, Japan

[21] Appl. No.: 160,062

[22] Filed: Jun. 16, 1980

[30] Foreign Application Priority Data

Jul. 9, 1979 [JP] Japan .................................. 54-85846

[51] Int. Cl.³ ...................... C21D 11/00; G01K 1/14
[52] U.S. Cl. .................................. 374/139; 136/234; 164/4.1; 266/88
[58] Field of Search ...................... 73/359 R; 136/234; 164/4.1, 150, 451; 266/88; 374/139

[56] References Cited

U.S. PATENT DOCUMENTS

| | | | |
|---|---|---|---|
| 2,224,081 | 12/1940 | Jung | 266/88 |
| 3,091,119 | 5/1963 | Fischer et al. | 73/343 R |
| 3,161,499 | 12/1964 | Percy | 266/88 X |
| 3,379,578 | 4/1968 | McTaggart et al. | 136/234 |
| 3,398,027 | 8/1968 | Lajarrige et al. | 136/234 |
| 3,580,078 | 5/1971 | MacKenzie | 73/344 |
| 3,610,045 | 10/1971 | Shearman | 136/234 |
| 3,816,183 | 6/1974 | Kraus | 136/234 |
| 4,135,538 | 1/1979 | Kurita | 136/234 |

Primary Examiner—Daniel M. Yasich
Attorney, Agent, or Firm—Frishauf, Holtz, Goodman & Woodward

[57] ABSTRACT

A method for measuring the temperature of molten metal received in a vessel, which includes covering the tip portion of a probe which includes a thermocouple housed in an alumina protecting tube, from inside to outside with a ceramic fiber and a quartz glass; attaching the covered probe to the side wall of a vessel so that the tip portion of said probe projects into said vessel, at a position below the allowable lowest level of the molten metal received in said vessel; and maintaining the level of the molten metal at or above the allowable lowest level, thereby always immersing said probe into the molten metal received in said vessel.

3 Claims, 2 Drawing Figures

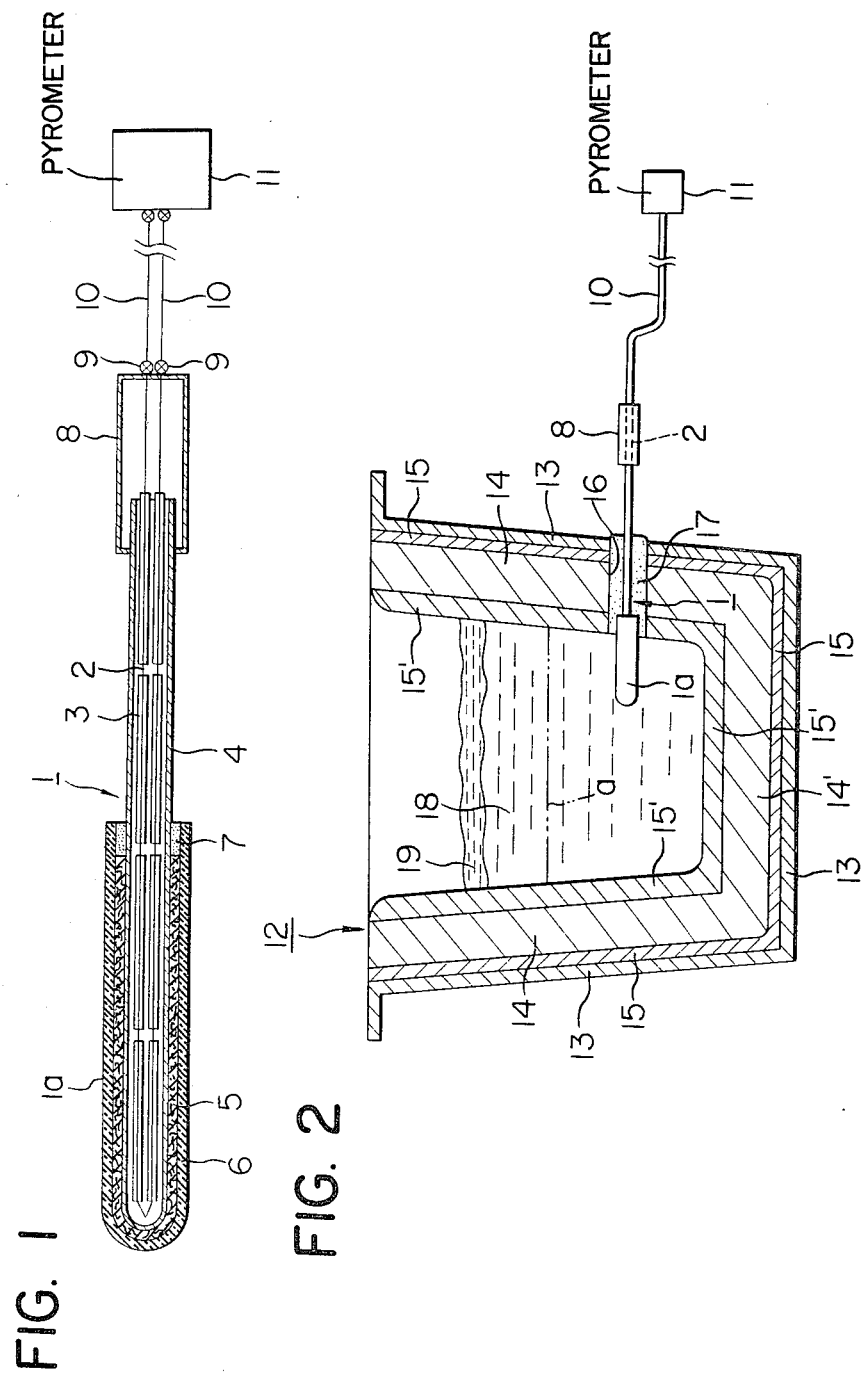

METHOD FOR MEASURING TEMPERATURE OF MOLTEN METAL RECEIVED IN VESSEL

FIELD OF THE INVENTION

The present invention relates to a method for continuously measuring the temperature of molten metal received in a vessel, particularly in a tundish for continuous casting.

BACKGROUND OF THE INVENTION

The practice of continuously casting molten metal in a continuous caster most commonly employed at present is carried out by the vertical continuous casting process which comprises casting molten metal received from a ladle into a tundish, through a teeming nozzle attached to the bottom wall of the tundish in downward projection, into a mold arranged vertically below the teeming nozzle to form a cast strand, and extracting the cast strand thus formed into a long strand from the lower end of the mold while cooling. The horizontal continuous casting process has recently been put to practical use, which comprises casting molten metal, through a teeming nozzle attached to the lowermost end of the side wall of a tundish horizontally in projection, into a mold arranged horizontally at the tip of the teeming nozzle on the same axis as the horizontal axis of said teeming nozzle, to form a cast strand, and extracting the cast strand thus formed into a long strand always horizontally from the mold while cooling.

In the above-mentioned continuous casting operations, the temperature of the molten metal received in the tundish exerts an important effect on the subsequent casting operations in the aspect of manufacturing a cast strand excellent in quality and free of such troubles as breakout. To continuously measure the temperature of the molten metal received in the tundish is therefore very important when manufacturing efficiency a cast strand.

The usual practice for measuring the temperature of molten metal received in a vessel such as a tundish as mentioned above has comprised connecting a probe having a thermocouple housed in an aluminum protecting tube to lead wires connected to a pyrometer, vertically lowering downward said probe into the vessel to a prescribed position in the vessel, and immersing said probe into the molten metal received in the vessel, thereby measuring the temperature of said molten metal by means of said probe.

In the above-mentioned conventional method for measuring the temperature of molten metal, however, the probe immersed in the molten metal is eroded by molten slag floating on the surface of the molten metal. It has therefore been difficult to immerse said probe for a long period of time and thus to continuously measure the temperature of the molten metal.

In addition, since the level of the molten metal recived in a tundish, for example, varies with the progress of casting, the probe positioned at a prescribed position in the tundish changes its relative position to the level of the molten metal under the effect of variation of the above-mentioned level of molten metal, and in some cases, the probe may measure the temperature of molten slag when the probe is located in the layer of molten slag floating on the surface of the molten metal. The method for measuring the temperature mentioned above tended to easily cause an error in the result of measurement.

Furthermore, since the probe is vertically lowered downward into a vessel such as a tundish, the position of attachment of the thermocouple housed in the probe and connected to the lead wires connecting with the pyrometer is located above the vessel containing the molten metal. As a result, said lead wires tended to be easily burnt out under the effect of radiation heat from the molten metal received in the vessel. In order to prevent the above-mentioned burnout of the lead wires, it is necessary to extend the thermocouple housed in the probe far to the outside of the probe so that the thermocouple may be connected to the lead wires at a position not affected by the radiation heat from the molten metal. The extension of the thermocouple requires, however, a large quantity of expensive thermocouple, thus leading to the problem of high cost.

Under such circumstances, there is a strong demand for the development of a method for measuring the temperature of molten metal received in a vessel, which permits continuous measurement, for a long period of time, of the temperature of the molten metal received in a molten metal vessel, especially in a tundish for continous casting, and also enables to prevent an error in measurement result from occurring irrespective of the variation in the level of the molten metal caused by the progress of casting and to prevent the lead wires attached to the probe from being burnt out. Such a method for measuring the temperature is not however as yet proposed.

SUMMARY OF THE INVENTION

An object of the present invention is therefore to provide a method for measuring the temperature of molten metal received in a vessel, especially, that received in a tundish for continous casting, continuously for a long period of time and accurately.

A further object of the present invention is to provide such a method for measuring the temperature of molten metal received in a vessel, without being affected by molten slag floating on the surface of the molten metal and by a variation of the level of molten metal, while preventing lead wires connected to a probe from being burnt out by the radiation heat from the molten metal.

In accordance with one of the features of the present invention, there is provided a method for measuring the temperature of molten metal received in a vessel, which comprises:

immersing a probe comprising a thermocouple housed in an alumina protecting tube into a molten metal received in a vessel, thereby continuously measuring the temperature of said molten metal;

said method being characterized by comprising:

covering the top portion of the probe, from inside to outside, with a ceramic fiber and a quartz glass; and, attaching said probe to the side wall of a vessel so that the top portion of said probe covered with the ceramic fiber and the quartz glass projects into said vessel, at a positon below the allowable lowest level of a molten metal received in said vessel, thereby immersing said probe into the molten metal received in said vessel.

BRIEF DESCRIPTION OF THE DRAWINGS

FIG. 1 is a schematic longitudinal sectional view illustrating an example of the probe used in the method for measuring the temperature of the present invention; and FIG. 2 is a schematic sectional view of a tundish for continous casting, illustrating an embodiment of the method for measuring the temperature of the present invention.

DETAILED DESCRIPTION OF PREFERRED EMBODIMENTS

We carried out extensive studies with a view to solving the aforementioned problems involved in the continuous measurement for a long period of time at a high accuracy of the temperature of molten metal received in a vessel, especially, that received in a tundish for continuous casting. As a result, we developed a method described below with reference to the drawings.

FIG. 1 is a schematic longitudinal sectional view illustrating an example of the probe used in the method of the present invention. In FIG. 1, 1 is a probe. The probe 1 comprises: a thermocouple 2 made by combining platinum and platinum-rhodium and attached with insulators 3 therearound, a heat-resistant alumina protecting tube 4 which is hardly eroded by molten metal and slag and contains said thermocouple 2, a ceramic fiber 5 covering the outer peripheral surface of the alumina protecting tube 4 at least at the tip portion 1a at which the probe 1 is in contact with the molten metal, and a quartz glass 6 covering to the outer peripheral surface of the ceramic fiber 5. Also in FIG. 1, 7 is a heat-resistant cement filling the gap between the quartz glass 6 and the alumina protecting tube 4 at the end opening portion of the quartz glass tube 6; 8 is a connector for the ends of the thermocouple 2 housed in the alumina protecting tube 4 and lead wires 10 connected to a pyrometer 11; and 9 are connecting terminals.

In the method for measuring the temperature of the present invention, the probe having the above-mentioned structure is attached to the side wall of the vessel so that the top portion of the probe covered with the ceramic fiber and the quartz glass projects into said vessel, at a position below the allowable lowest level of the molten metal received in said vessel, thereby immersing said probe into the molten metal received in the vessel to measure the temperature of said molten metal.

FIG. 2 is a schematic sectional view of a tundish for continous casting, illustrating an embodiment of the method for measuring the temperature of the present invention. In FIG. 2, 12 is a tundish for continuous casting; 14 is a side wall of the tundish 12; 14' is the bottom wall of the tundish 12; the side wall 14 and the bottom wall 14' being formed with a refractory material; 13 is a steel plate covering the side wall 14 and the bottom wall 14'; 15 is a refractory coating material filling the space between the side wall 14 and the bottom wall 14' on one hand and the steel plate 13 on the other hand; and, 15' is a refractory coating material applied to the inner peripheral surface of the side wall 14 and the bottom wall 14'.

In the side wall 14 on one side of the above-mentioned tundish 12, and insertion hole 16 for the probe 1 is horizontally provided through the side wall 14 at a position below the allowable lowest level of molten metal 18 received in the tundish 12. The probe 1 is inserted into said insertion hole 16, with the tip portion 1a thereof in contact with the molten metal as a projection into the interior of the tundish from the inner surface of the side wall 14, and the connector 8 is located outside the side wall 14. The above-mentioned insertion of the probe 1 into the insertion hole 16 is performed by filling the insertion hole 16 having the probe 1 inserted therein with a heat-resistant stamping material 17 such as a magnesia stamping material and zircon stamping material and compacting same. The thermocouple 2 of the probe 1 and the lead wires 10 connected to the pyrometer 11 are connected by the connector 8 located outside the side wall 14. The tip portion 1a of the probe 1 projecting into the interior of the tundish 12 should preferably be at least 20 mm in length as measured from the inner surface of the side wall of the tundish 12.

In the present invention, as mentioned above, the temperature of the molten metal 18 received in the tundish 12 is measured by the probe 1 inserted, at a position below the allowable lowest level of the molten metal 18, horizontally through the side wall 14. The probe 1 is therefore never eroded by the molten slag 19 floating on the surface of the molten metal 18, and a variation in the level of the molten metal 18, if occurring along with the progress of casting, exerts no influence, thus permitting an accurate measurement of temperature. The molten metal is pured into the tundish 12 in a conventional manner such as disclosed in U.S. Pat. No. 3,075,264 (particularly FIGS. 5, 10, 11 and 13 thereof).

In the probe 1, as mentioned above, at least the tip portion 1a of the outer peripheral surface of the alumina protecting tube 4 in contact with the molten metal 18 is covered, from inside to outside, by a ceramic fiber 5 and a quartz glass 6. In the initial stage in which the molten metal 18 is received in the tundish 12, therefore, even if the probe 1 is subjected to a heat shock, the heat shock does not lead to the breakage of the alumina protecting tube 4, because the alumina protecting tube 4 is covered by the ceramic fiber 5 and the quartz glass 6, and there occurs no direct contact with the molten metal 18 at least until the alumina protecting tube 4 is heat-saturated by the heat from the molten metal 18. By filling the gap between alumina protecting tube 4 and the thermocouple 2 with a refractory material, it is possible, at a breakage of the alumina protecting tube, to prevent the molten metal 18 from flowing out from the probe 1.

Since the thermocouple 2 housed in the alumina protecting tube 4 and the lead wires 10 connected to the pyrometer 11 are connected by the connector 8 located on the outside of the side wall 14, the lead wires 10 are free from the influence of the radiation heat of the molten metal 18 received in the tundish 12, and hence, are never burnt out by the radiation heat of the molten metal 18.

Although the probe 1 is horizontally inserted into the tundish 12 through the side wall 14 of the tundish 12 in the above-mentioned example, the direction of insertion is not limited to the horizontal direction, but may by a direction inclining either upward or downward.

The example described above has covered the case where the method of the present invention is applied for measuring the temperature of the molten metal received in a tundish for continuous casting. It is however needless to mention that the method of the present invention is applicable also to the measurement of temperature of a molten metal received in any of the various other types of vessels.

According to the method of the present invention, as described above in detail, it is possible to continuously and accurately measure for a long period of time the temperature of molten metal received in a vessel, without being affected by molten slag floating on the surface of the molten metal and by a variation in the level of the molten metal, and with lead wires connected to a probe being free from burnout caused by the radiation heat of the molten metal. In particular, when the method of the present invention is applied to a tundish for continous casting, it is possible to continuously and accurately measure the temperature of molten metal received in the tundish, thus allowing continuous casting operations under optimum conditions, and permitting manufacture of a cast strand excellent in quality without occurrence of such troubles as a breakout of the cast strand. Thus, according to the method for measuring the temperature of the present invention, many industrially useful effect are provided.

What is claimed is:

1. In a method for measuring the temperature of a molten metal received in a casting vessel, the molten metal received in said casting vessel having molten slag floating on the upper surface thereof, which comprises:
covering at least the tip portion of a probe comprising a thermocouple housed in an alumina protecting tube, from inside to outside, with a ceramic fiber and a quartz glass layer over said ceramic fiber; attaching said covered probe to the side wall of the casting vessel so that said probe projects into said casting vessel; pouring molten metal into said casting vessel to immerse said probe in said molten metal; and continuously measuring, by means of said immersed probe, the temperature of said molten metal poured into said casting vessel and in which said probe is immersed;

the improvement comprising:
attaching said probe to said side wall of said casting vessel through an opening in said side wall of said vessel at a position spaced from the bottom of the casting vessel and below a preselected allowable lowest level of the molten metal which is higher than said opening when the molten metal is received in said casting vessel; and the level of said molten metal received in said casting vessel always being maintained higher than or at least equal to said preselected allowable lowest level of molten metal by pouring in additional molten metal as needed, so that said probe does not contact the molten slag which floats on the surface of the molten metal so that said probe is not eroded by the molten slag which floates on the surface of the molten metal, whereby the temperature of the molten metal in said casting vessel is accurately measured substantially without being affected by the influence of the molten slag contacting said probe or deteriorating said probe.

2. The method of claim 1, wherein said probe has a gap between the alumina protecting tube and the thermocouple, said gap being filled with a refractory material.

3. The method of claim 1 or 2, wherein said vessel is a tundish for continuous casting.

* * * * *